July 6, 1937.  R. P. MAY  2,085,919
FILM GATE
Original Filed Nov. 3, 1931    5 Sheets-Sheet 2

INVENTOR
RUSSELL P. MAY
BY
ATTORNEY

July 6, 1937.  R. P. MAY  2,085,919
FILM GATE
Original Filed Nov. 3, 1931   5 Sheets-Sheet 3
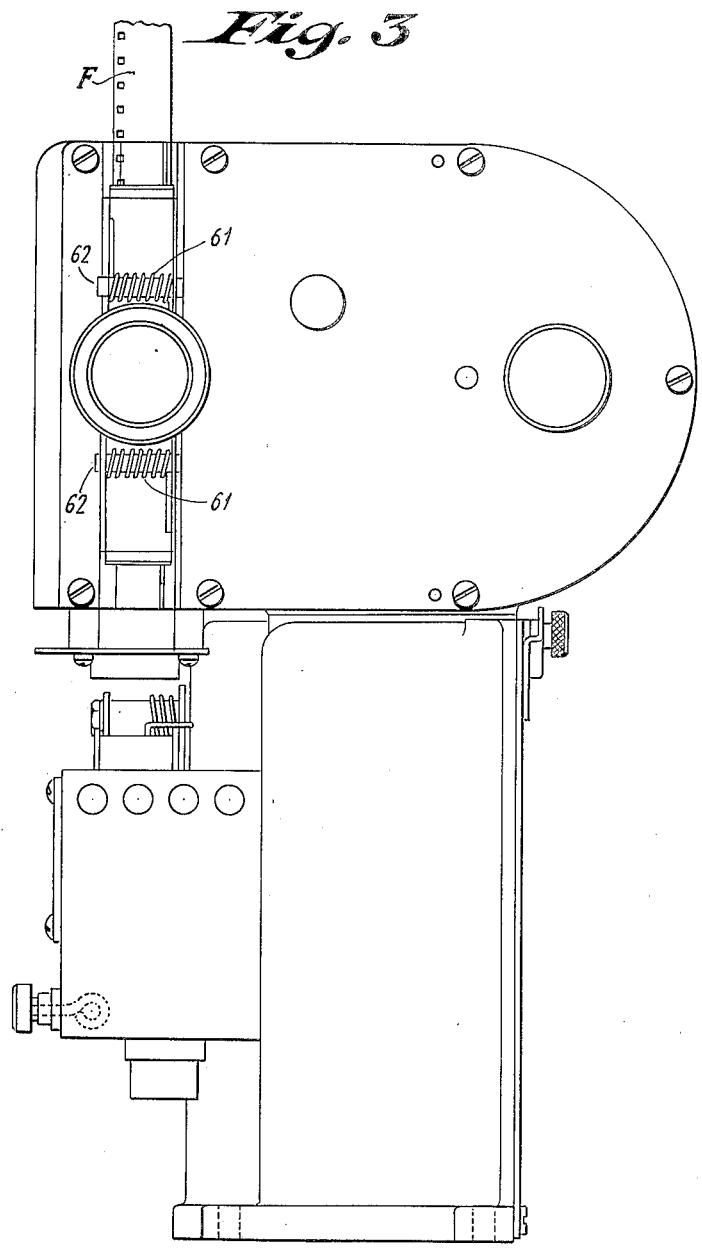
INVENTOR
RUSSELL P. MAY
BY
ATTORNEY July 6, 1937.   R. P. MAY   2,085,919
FILM GATE
Original Filed Nov. 3, 1931   5 Sheets-Sheet 4
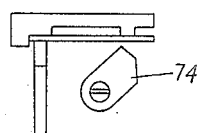
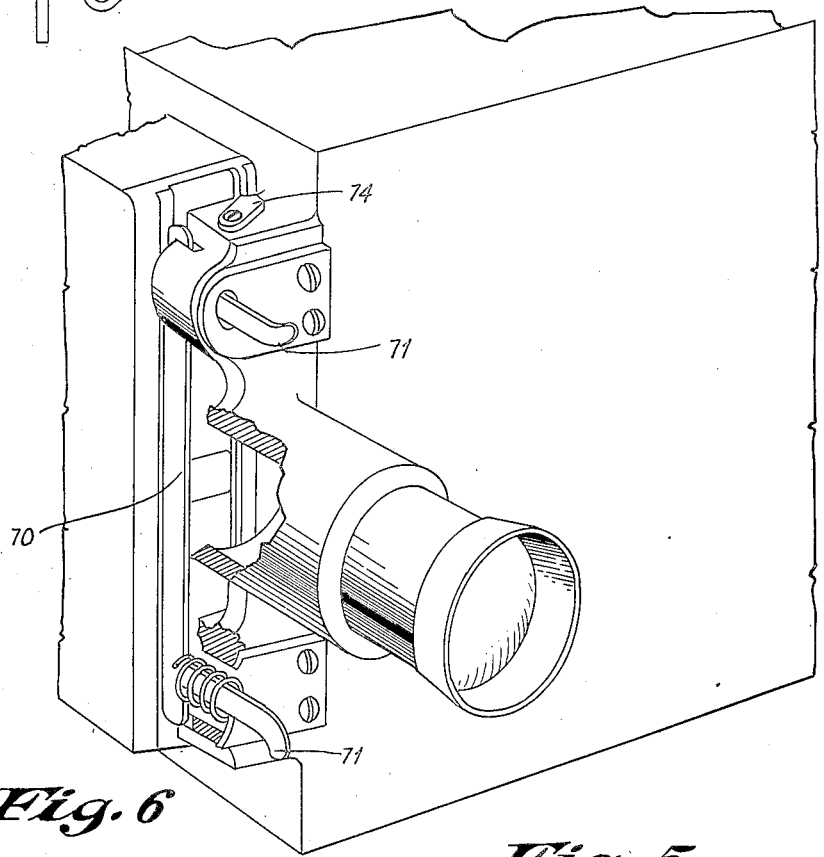
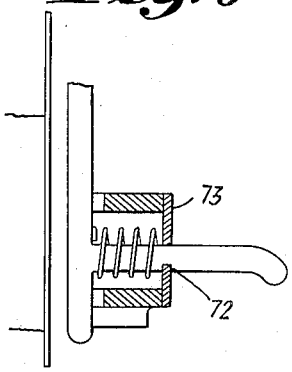
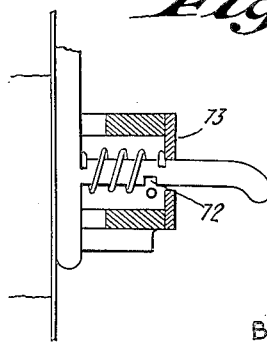
INVENTOR
RUSSELL P. MAY
BY
ATTORNEY Patented July 6, 1937

2,085,919

UNITED STATES PATENT OFFICE 2,085,919

FILM GATE

Russell P. May, East Orange, N. J., assignor to Radio Corporation of America, a corporation of Delaware Original application November 3, 1931, Serial No. 572,804, now Patent No. 2,003,381, dated June 4, 1935. Divided and this application December 4, 1933, Serial No. 700,808

1 Claim. (Cl. 88—17)

The present invention relates to portable talking motion picture apparatus particularly adapted to home and educational use, and is a division of my Patent No. 2,003,381, issued June 4, 1935. It involves the provision of an improved projector, an improved sound reproducer, and an improved amplifier, all built into a single, lightweight, inexpensive unit fitted within a soundproof carrying case.

One object of the invention is to provide an improved talking motion picture apparatus adapted to use 16 mm. film which carries thereon a soundtrack of one of the usual types in commercial use.

Another object of the invention is to provide such an apparatus which is capable of high quality sound reproduction from such a film.

Another object of the invention is to provide such an apparatus which requires a minimum power to operate it and which can therefore be operated from any ordinary household power supply.

Another object of the invention is the provision of an improved film gate which permits the film to be driven from one row of sprocket holes only without flicker at the aperture and without the film tending to run off to one side or the other.

Other and ancillary objects of the invention will be apparent from a reading of the following specification in connection with the accompanying drawings and its scope will be pointed out in the appended drawings wherein:

Referring to the drawings:

Fig. 3 is a front view of the film gate showing a modified form of the springs.

Fig. 4 shows a modified form of film gate.

Figs. 5, 6, and 7 show details thereof; and

Figure 8:
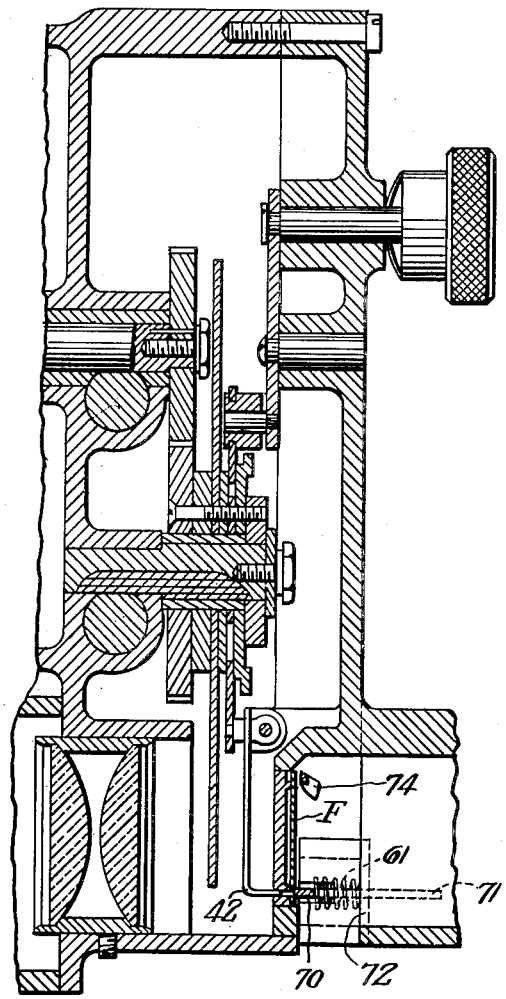

Fig. 8 is a transverse section through the gate shown in Fig. 4.

The film F with which this projector is intended to co-operate is of the conventional 16 mm. width and is provided with pictures of exactly the same size as are ordinarily used on 16 mm. amateur film. The main difference from the usual amateur film is that one roll of sprocket holes is omitted and a soundtrack preferably of the variable area type and approximately 6/100ths of an inch in width is located approximately where the row of sprocket holes would have been. Other differences are that the film is made to run at a speed of 24 frames or pictures per second which is the usual speed in talking motion pictures instead of 16 pictures per second which has heretofore been usual in 16 mm. films. The reason for this is that such pictures can be properly printed by projection when desired from standard theatre films or the equivalent without requiring that a special negative be taken and a special soundtrack be made to be capable of reproduction in this apparatus.

Figure 1:
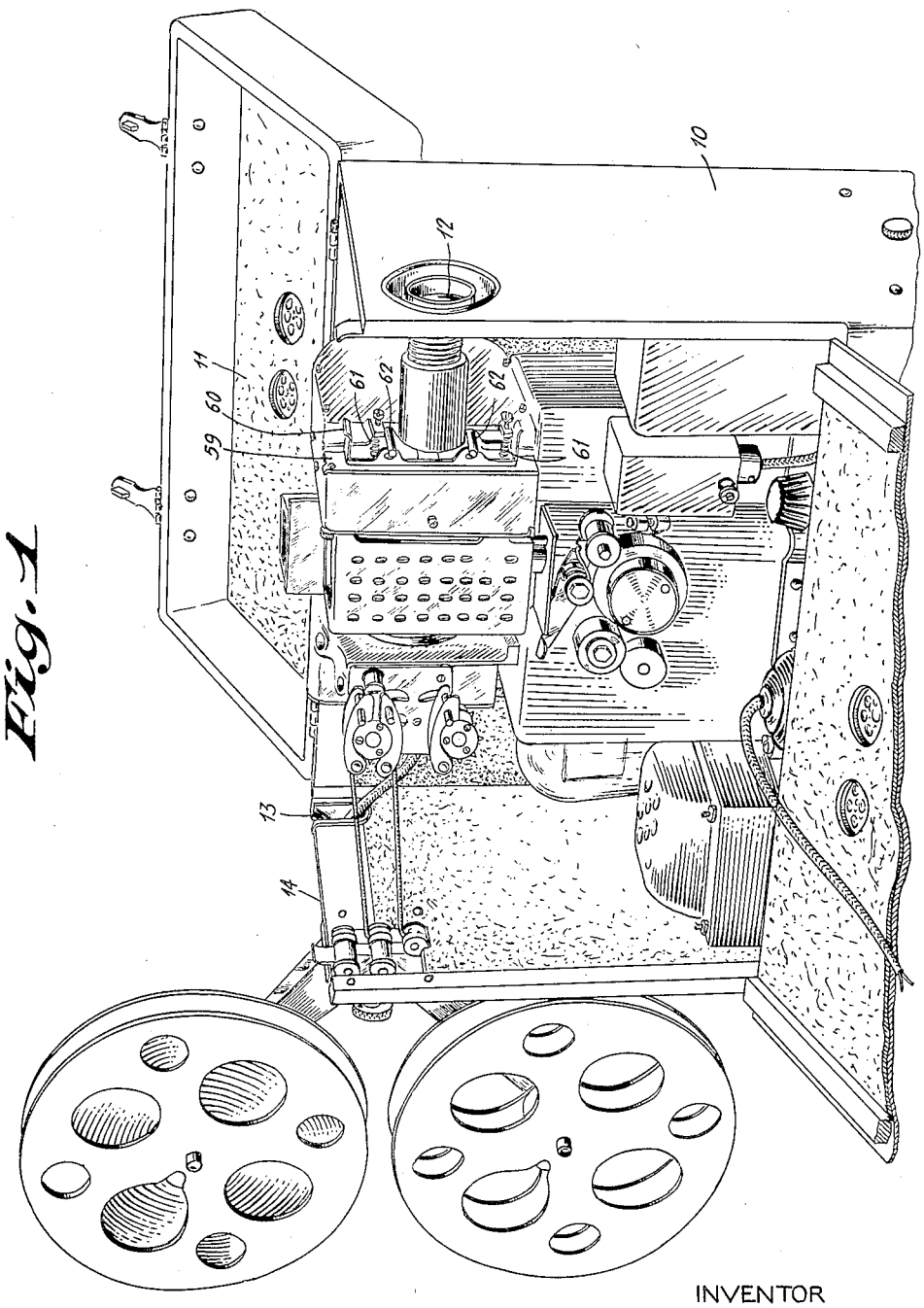
Fig. 1 is a side view of the projector as mounted in the carrying case and with the carrying case open for threading of the projector.

The projector as shown in Fig. 1 is housed within a carrying case 10. This carrying case as indicated at 11 is lined with appropriate sound-absorbing material to absorb any noise which might be produced by the projector mechanism, the motor, or the fluttering of the film in order to avoid any disturbance of the audience, and is provided with suitable apertures for the lens as at 12, for the entrance and exit of wires as at 13, and for the entrance and exit of the film as at 14.

After the film F has been threaded with the case open, the case is closed and remains in closed position during operation, thereby retaining within the case not only the noise of the projector but also any stray light which may escape from the lamphouse.

Figure 2:
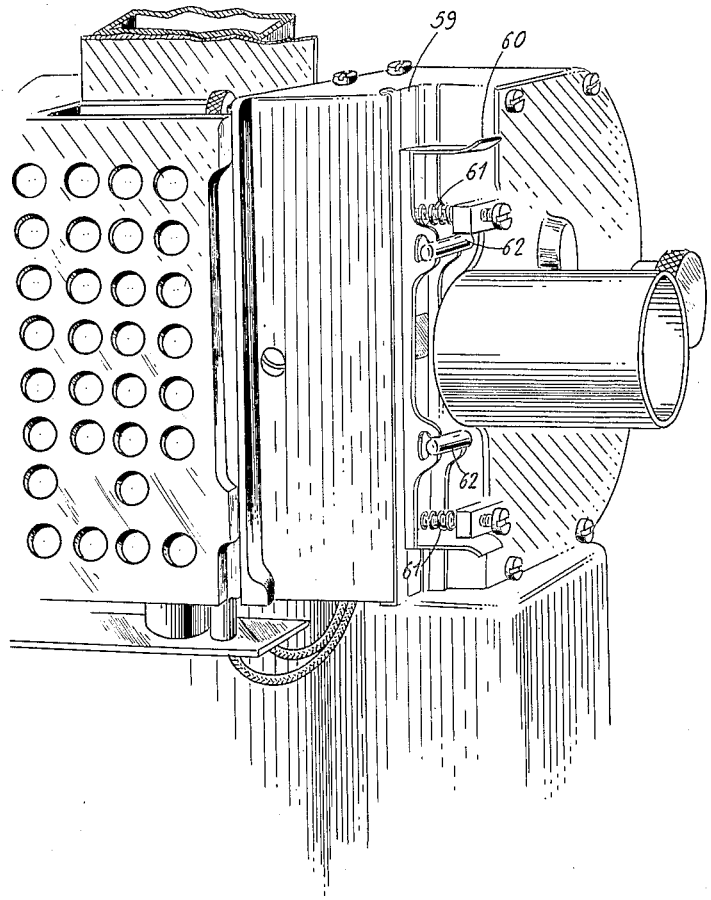
Fig. 2 is an enlarged view of the film gate.

One form of my improved film gate is shown in Figs. 1, 2, and 3. In this form of gate there is a plate 59 attached to the motor housing in front of the optical system and shutter, and this plate has an appropriately surfaced channel in it to receive the film. Against this plate bears the pressure shoe 60 which is in the form of a pressed metal plate having appropriately formed contact surfaces for the film and having outwardly extending ears at the top and bottom, as shown, by which it may be grasped to open it. This gate is held in closed position by the springs 61 against the pressure of which it may be opened by grasping the ears above referred to and the elongated apertures in the sides of the gate which engage the pins 62 may then be slid down over the pins 62, retaining the gate in open position.

As shown in Figs. 1 and 2, the springs 61 are of the helical compression type. In Fig. 3 is shown a more compact spring consisting of the coil type mounted around the rods 62 thereby providing a construction avoiding the projecting springs shown in Figs. 1 and 2.

A modified form of gate is shown in Fig. 4 and this particular form of gate is found to be peculiarly effective when the film F is drawn by traction of the intermittent feed 42 on sprocket holes on one edge of the film only.

In this gate a backing plate 59 is provided as in the gate previously referred to, but the film is pressed toward this by a linear shoe 70. This shoe is provided with ears 71 which serve the same function as the ears above referred to and these ears are each provided with a notch 72 in their lower edges whereby the pressure shoe may be maintained in open position by drawing it outwardly and hooking these notches over the plates 73, which also serve as spring-retaining members.

The opposite edge of the film is prevented from fluttering by a guide 74 which extends the entire length of the gate but which, instead of being pressed firmly against the film by springs, is set at such spacing from the guide on the backing plate that the film can move freely therebetween. This avoids producing any tension on the edge of the film which is not drawn by the intermittent and at the same time, due to the small clearance (which may be of the order of two one-thousandths of an inch) the guide acting in co-operation with the pressure shoe at the other edge of the aperture, prevents any flutter of the film at the projection aperture.

I claim:

A film gate comprising means for maintaining one edge of the film passing therethrough and fed at that edge only under tension, and guide means on the other edge of the film to minimize flutter, said guide means so spaced from the backing plate that the film can move freely therebetween.

RUSSELL P. MAY.